United States Patent
Wang et al.

(10) Patent No.: US 12,066,729 B2
(45) Date of Patent: Aug. 20, 2024

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Wuhui Wang, Shenzhen (CN); Mengyang Liu, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/309,482

(22) PCT Filed: May 10, 2021

(86) PCT No.: PCT/CN2021/092579
§ 371 (c)(1),
(2) Date: May 31, 2021

(87) PCT Pub. No.: WO2022/217678
PCT Pub. Date: Oct. 20, 2022

(65) Prior Publication Data
US 2024/0053645 A1    Feb. 15, 2024

(30) Foreign Application Priority Data
Apr. 13, 2021    (CN) .......................... 202110392451.4

(51) Int. Cl.
*G02F 1/1368*    (2006.01)
*G02F 1/1362*    (2006.01)

(52) U.S. Cl.
CPC ...... *G02F 1/1368* (2013.01); *G02F 1/136286* (2013.01)

(58) Field of Classification Search
CPC .......................... G02F 1/1368; G02F 1/136286
(Continued)

(56) References Cited

U.S. PATENT DOCUMENTS

| 2008/0042139 A1 | 2/2008 | Huh et al. |
| 2010/0045920 A1* | 2/2010 | Kwak ................. G02F 1/13394 349/149 |
| 2019/0227385 A1 | 7/2019 | Aoyama et al. |

FOREIGN PATENT DOCUMENTS

| CN | 101692327 A | 4/2010 |
| CN | 104393003 A | 3/2015 |

(Continued)

OTHER PUBLICATIONS

International Search Report in International application No. PCT/CN2021/092579, mailed on Jan. 13, 2022.
(Continued)

*Primary Examiner* — Michael H Caley
*Assistant Examiner* — Illiam D Peterson
(74) *Attorney, Agent, or Firm* — PV IP PC; Wei Te Chung; Zhigang Ma (57) ABSTRACT

A display panel and a display device are provided. The display panel includes a display region and a gate driving wiring region disposed on at least one side of the display region. Color resists are disposed corresponding to regions of the display region and the gate driving wiring region. The gate driving wiring region includes a first metal layer and second metal layers disposed on the first metal layer, and the color resists located in the gate driving wiring region at least cover the second metal layers.

18 Claims, 3 Drawing Sheets

(58) Field of Classification Search
USPC .......................................................... 349/149
See application file for complete search history.

(56) References Cited

FOREIGN PATENT DOCUMENTS

| | | | | |
|---|---|---|---|---|
| CN | 106547127 A | 3/2017 | | |
| CN | 107908047 A | 4/2018 | | |
| CN | 108761941 A | * 11/2018 | ........... | G02F 1/1362 |
| CN | 108761941 A | 11/2018 | | |
| CN | 109887968 A | 6/2019 | | |
| CN | 109976049 A | 7/2019 | | |
| CN | 112068372 A | 12/2020 | | |
| JP | 8146402 A | 6/1996 | | |
| JP | 2001175198 A | 6/2001 | | |
| JP | 2003202589 A | 7/2003 | | |
| JP | 2007250983 A | 9/2007 | | |
| JP | 2008205333 A | 9/2008 | | |
| JP | 2010040520 A | 2/2010 | | |
| JP | 2013084925 A | 5/2013 | | |

OTHER PUBLICATIONS

Written Opinion of the International Search Authority in International application No. PCT/CN2021/092579, mailed on Jan. 13, 2022.
Chinese Office Action issued in corresponding Chinese Patent Application No. 202110392451.4 dated Nov. 2, 2021, pp. 1-8.
Japanese Office Action issued in corresponding Japanese Patent Application No. 2021-526344 dated Jun. 19, 2023, pp. 1-8.

* cited by examiner

DISPLAY PANEL AND DISPLAY DEVICE

CROSS REFERENCE TO RELATED APPLICATIONS

This application is a National Phase of PCT Patent Application No. PCT/CN2021/092579 having international filing date of May 10, 2021, which claims priority of Chinese patent Application No. 202110392451.4 filed on Apr. 13, 2021 with the National Intellectual Property Administration, titled "DISPLAY PANEL AND DISPLAY DEVICE", which is incorporated by reference in the present application in its entirety.

BACKGROUND OF INVENTION

Field of Invention

The present application relates to the field of display technology and particularly to a display panel and a display device.

Description of Prior Art

Thin film transistor liquid crystal displays (TFT-LCDs) have advantages such as lightness, thinness, environmental protection, high performance, etc., and have been used in various electronic products, especially in display products of large sizes. In order to improve effect of visual perception, visible rages are widened, and requirements of display bezels are increasingly narrower. Currently, gate driver on array (GOA) technology is an important means to realize narrow bezels. In this technology, driving circuits of electrodes are directly designed on array substrates. While widths of bezels are reduced, manufacturing procedures can also be decreased, which reduces product cost and allows panels to be lighter and thinner.

Display panel circuit integrations of GOA regions are complicated and cover protective film layers of first metal layers and second metal layers. For example, thicknesses of passivation layers on the second metal layers are relatively thicker. In some procedures of etching processes of via holes, these protective film layers are prone to be etched and damaged, resulting in the second metal layers being exposed, or short-circuit between the first metal layers and the second metal layers, thereby causing functions of the display panels to be abnormal.

A technical problem of short circuit between two metal layers is prone to occur in the GOA regions of current display panels.

SUMMARY OF INVENTION

The present application provides a display panel and a display device used to remedy the technical problem that short circuit easily exists between metal layers of the GOA regions of display panels.

The present application provides a display panel, including a display region and a gate driving wiring region disposed on at least one side of the display region.

The display panel further includes a color resist layer disposed corresponding to the display region and the gate driving wiring region. The color resist layer includes color resists.

The gate driving wiring region includes a first metal layer and second metal layers disposed on the first metal layer. The color resists located in the gate driving wiring region at least cover the second metal layers.

In the display panel of the present application, the gate driving wiring region further includes a first insulation layer disposed between the first metal layer and the second metal layers, and the color resists located in the gate driving wiring region cover the first insulation layer.

In the display panel of the present application, the gate driving wiring region includes a photoresist layer, and the photoresist layer covers color resists located in the gate driving wiring region.

In the display panel of the present application, the photoresist layer is disposed in the display region, and the photoresist layer covers the color resists located in the display region.

In the display panel of the present application, the gate driving wiring region further includes a second insulation layer disposed between the second metal layers and the color resist layer, and the color resists located in the gate driving wiring region cover the second insulation layer.

In the display panel of the present application, the display panel further includes pixel electrodes, and at least part of the pixel electrodes are located in the gate driving wiring region.

In the display panel of the present application, the pixel electrodes located in the gate driving wiring region are disposed on the photoresist layer.

In the display panel of the present application, a semiconductor layer is further disposed between the first metal layer and the first insulation layer, and the second metal layers are disposed on the semiconductor layer.

In the display panel of the present application, the first metal layer is disposed corresponding to the display region and the gate driving wiring region, and the second metal layers are disposed corresponding to the display region and the gate driving wiring region.

In the display panel of the present application, the color resists located in the gate driving wiring region include blue color resists.

In the display panel of the present application, the display panel further includes a common wiring region disposed on a side of the gate driving wiring region away from the display region, and common wirings are disposed in the common wiring region.

In the display panel of the present application, the first metal layer covers the display region and the gate driving wiring region of the display panel.

In the display panel of the present application, the second metal layers cover the display region and the gate driving wiring region of the display panel.

In the display panel of the present application, the first metal layer includes gate electrodes configured to compose thin film transistors.

In the display panel of the present application, the second metal layers include source electrodes and drain electrodes configured to compose thin film transistors.

In the display panel of the present application, the pixel electrodes disposed corresponding to the display region are electrically connected to the second metal layers.

In the display panel of the present application, the first metal layer includes source electrodes and drain electrodes configured to compose thin film transistors.

In the display panel of the present application, the second metal layers include gate electrodes configured to compose thin film transistors.

In the display panel of the present application, the pixel electrodes disposed corresponding to the display region are electrically connected to the first metal layer.

The present application further provides a display device including a display panel. The display panel includes a display region and a gate driving wiring region disposed on at least one side of the display region.

The display panel further includes a color resist layer disposed corresponding to the display region and the gate driving wiring region. The color resist layer includes color resists.

The gate driving wiring region includes a first metal layer and second metal layers disposed on the first metal layer. The color resists located in the gate driving wiring region at least cover the second metal layers.

The present application provides a display panel and a display device. The display panel includes a display region and a gate driving wiring region disposed on at least one side of the display region. The display panel further includes a color resist layer disposed corresponding to the display region and the gate driving wiring region. The color resist layer includes color resists. The gate driving wiring region includes a first metal layer and second metal layers disposed on the first metal layer. The color resists located in the gate driving wiring region at least cover the second metal layers. In the present application, by disposing the color resists covering the second metal layers in the gate driving wiring region, protection for the second metal layers is enhanced, and the second metal layers being exposed and short-circuit between the first metal layer and the second metal layers due to fabrication processes such as etching of the display panel is prevented, which is conducive to improving yield of the fabrication processes of the display panel. Furthermore, the color resists covering the second metal are same as the color resists of the display region, and they can be manufactured in one same fabrication process. Therefore, adding color resist structures in the gate driving wiring region does not cause production processes of the display panel to be complicated.

DESCRIPTION OF DRAWINGS

To more clearly illustrate embodiments or the technical solutions of the present application, the accompanying figures of the present application required for illustrating embodiments or the technical solutions of the present application will be described in brief. Obviously, the accompanying figures described below are only part of the embodiments of the present application, from which figures those skilled in the art can derive further figures without making any inventive efforts.

DETAILED DESCRIPTION OF EMBODIMENTS

The descriptions of embodiments below refer to accompanying drawings in order to illustrate certain embodiments which the present application can implement. The directional terms of which the present application mentions, for example, "top", "bottom", "upper", "lower", "front", "rear", "left", "right", "inside", "outside", "side", etc., only refer to directions of the accompanying figures. Therefore, the used directional terms are for illustrating and understanding the present application, but not for limiting the present application. In the figures, units with similar structures are indicated by the same reference numerals.

Embodiments of the present application provide a display panel and a display device. The display panel includes a display region and a gate driving wiring region disposed on at least one side of the display region. The display panel further includes a color resist layer disposed corresponding to the display region and the gate driving wiring region. The color resist layer includes color resists. The gate driving wiring region includes a first metal layer and second metal layers disposed on the first metal layer. The color resists located in the gate driving wiring region at least cover the second metal layers. In embodiments of the present application, by disposing the color resists covering the second metal layers in the gate driving wiring region, protection for the second metal layers is enhanced, and the second metal layers being exposed and short-circuit between the first metal layer and the second metal layers due to fabrication processes such as etching of the display panel is prevented, which is conducive to improving yield of the fabrication processes of the display panel. Furthermore, the color resists covering the second metal are same as the color resists of the display region, and they can be manufactured in one same fabrication process. Therefore, adding color resist structures in the gate driving wiring region does not cause production processes of the display panel to be complicated.

Figure 1:
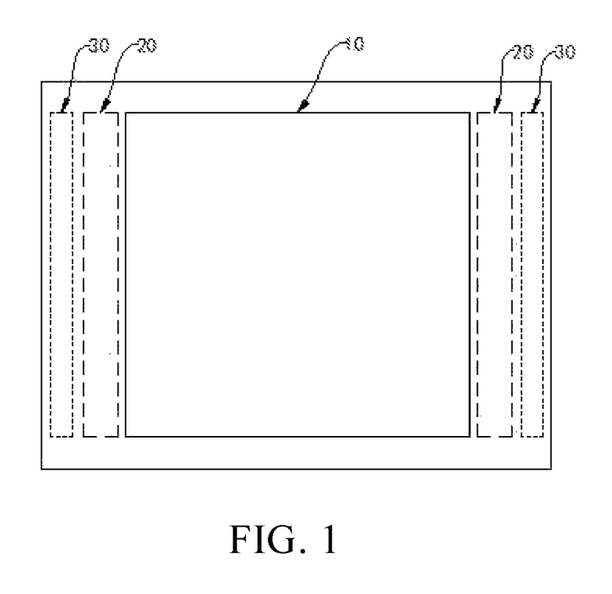
FIG. 1 is a schematic diagram of a planar structure of a display panel provided by one embodiment of the present application.

Please refer to FIG. 1. FIG. 1 is a schematic diagram of a planar structure of the display panel provided by one embodiment of the present application. The display panel includes a display region 10, a gate driving wiring region 20 disposed on a side of the display region 10, and a common wiring region 30 disposed on a side of the gate driving wiring region 20 away from the display region 10. The display region 10 is a region where the display panel performs a display function. A plurality of pixel units configured to realize the display function are disposed in the display region 10.

Optionally, the gate driving wiring region 20 includes two portions, which are respectively disposed on two opposite sides of the display region 10 correspondingly. A gate electrode driving circuit is disposed in the gate driving wiring region 20. The gate electrode driving circuit is configured to drive the pixel units in the display region 10 to display.

Optionally, the common wiring region 30 includes two portions, which are respectively disposed on two opposite sides of the display panel and are both located on a side of the gate driving wiring region 20 away from the display region 10. Common wirings are disposed in the common wiring region 30. The common wirings are configured to provide common voltage signals to the pixel units in the display region 10.

Figure 2:
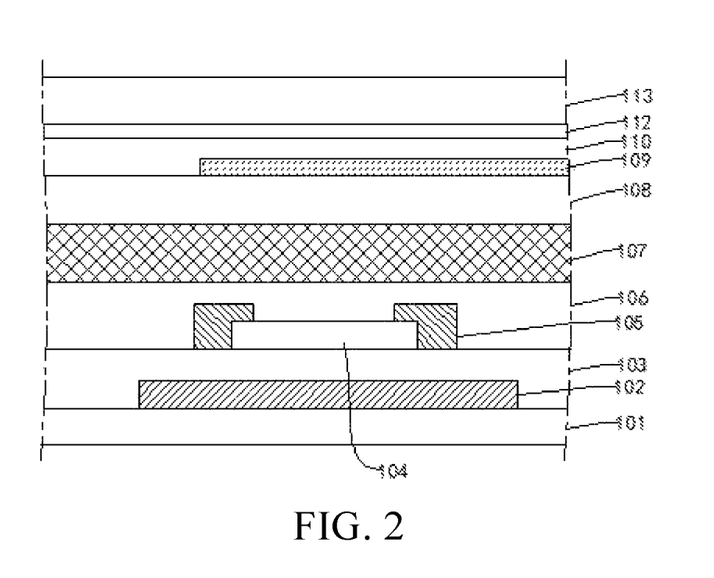
FIG. 2 is a schematic diagram of a first partially sectional structure of a gate driving wiring region of the display panel illustrated in FIG. 1.
Figure 3:
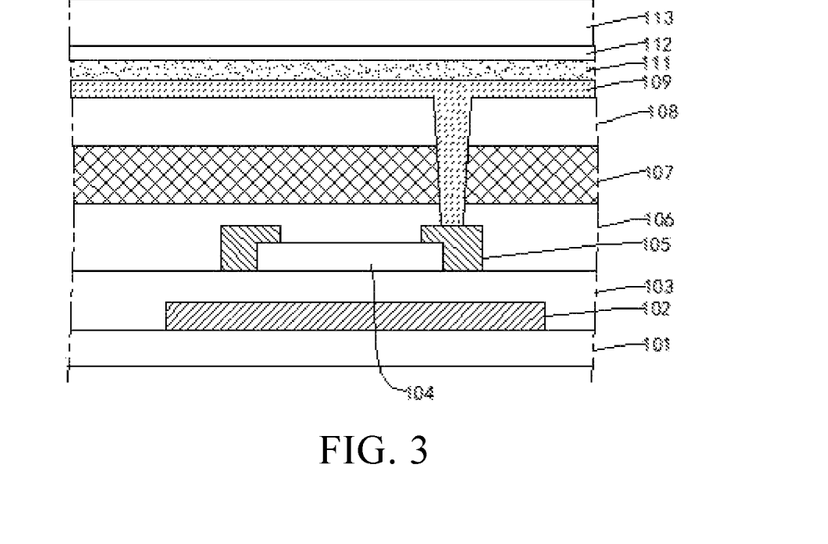
FIG. 3 is a schematic diagram of a first partially sectional structure of a display region of the display panel illustrated in FIG. 1.

In one embodiment, please refer to FIG. 2 and FIG. 3. FIG. 2 is a schematic diagram of a first partially sectional structure of the gate driving wiring region of the display panel illustrated in FIG. 1. FIG. 3 is a schematic diagram of a first partially sectional structure of the display region of the display panel illustrated in FIG. 1.

The display panel includes a base substrate 101 covering the display region 10 and the gate driving wiring region 20. The base substrate 101 can be a hard substrate of glass, etc., and can also be a flexible substrate of polyimide, etc.

The display panel includes a first metal layer 102 disposed on the base substrate 101. The first metal layer 102 covers the display region 10 and the gate driving wiring region 20 of the display panel. Metal wirings are disposed on the first metal layer 102, e.g., a gate electrode and a gate line located in the gate driving wiring region 20.

The display panel includes a first insulation layer 103 covering the first metal layer 102. The first insulation layer 103 covers the display region 10 and the gate driving wiring region 20 of the display panel. The first insulation layer 103 includes an inorganic insulation material. The first insulation layer 103 can be a gate insulation layer.

The display panel includes a semiconductor layer 104 disposed on the first insulation layer 103. The semiconductor layer 104 covers the display region 10 and the gate driving wiring region 20 of the display panel. A semiconductor material is disposed in the semiconductor layer 104. The semiconductor material is configured to form an active layer of a thin film transistor.

The display panel further includes second metal layers 105 disposed on the semiconductor layer 104. The second metal layers 105 cover the display region 10 and the gate driving wiring region 20 of the display panel. A part of a region of the second metal layers 105 is located on the first insulation layer 103. The second metal layers 105 and the first metal layer 102 are maintained electrical insulation by the first insulation layer 103. Metal wirings are disposed on the second metal layers 105. The metal wirings include source lines and drain lines configured to compose the thin film transistor.

The display panel further includes a second insulation layer 106 covering the second metal layers 105. The second insulation layer 106 covers the display region 10 and the gate driving wiring region 20 of the display panel. The second insulation layer 106 can further cover the first insulation layer 103 and the semiconductor layer 104. The second insulation layer 106 includes an inorganic insulation material.

The display panel further includes a color resist layer 107 located on the second insulation layer 106. The color resist layer 107 covers the display region 10 and the gate driving wiring region 20 of the display panel. The color resist layer 107 includes a plurality of color resists.

In the gate driving wiring region 20, the color resists in the color resist layer 107 at least cover regions where the second metal layers 105 are located. Because the second metal layers 105 are located on an upper layer of the first metal layer 102 and the first insulation layer 103, the color resists covering the second metal layers 105 also naturally cover the first metal layer 102 and the first insulation layer 103. Furthermore, because the color resist layer 107 is located on an upper layer of the second insulation layer 106, it inevitably covers the second insulation layer 106. Therefore, in this embodiment, the color resist layer 107 can be used to realize protection for insulation film layers near the second metal layers 105.

Furthermore, color resists located in the gate driving wiring region 20 can be at least one of blue color resists, green color resists, or red color resists, and the blue color resists are preferred. When the color resists of the gate driving wiring region 20 are configured as the blue color resists, using the color resists to protect film layers near the second metal layers 105 is realized, while low light transmissive or non-light transmissive effect of the display panel in the gate driving wiring region 20 is achieved by using a characteristic of light of the blue color resists being relatively dark at the same time, which improves display quality of the display panel.

In this embodiment, by disposing the color resists covering the second metal layers 105 in the gate driving wiring region 20, protection for film layers near the second metal layers 105 is enhanced, the second metal layers 105 being exposed and short-circuit between the first metal layer 102 and the second metal layers 105 due to fabrication processes such as etching of the display panel generating effect of etching and damage on the insulation layer covering the second metal layers 105 and the insulation layer between the first metal layer 102 and the second metal layers 105 is prevented. Therefore, this embodiment is conducive to improving yield of the fabrication processes of the display panel.

In the display region 10, the color resist layer 107 includes a plurality of color resist blocks arranged in an array manner. Each of the color resist blocks is disposed corresponding to one pixel unit of the display panel. The color resists located in the display region 10 include red color resists, green color resists, and blue color resists. The red color resists, the green color resists, and the blue color resists are arranged alternately. The red color resists correspond to red pixel units of the display panel. The green color resists correspond to green pixel units of the display panel. The blue color resists correspond to blue pixel units of the display panel. The color resists located in the display region 10 are configured to filter light emitted from the display panel, thereby realizing color display.

Furthermore, materials and manufacturing processes of the color resists located in the display region 10 and the color resists located in the gate driving wiring region 20 are maintained consistent. Therefore, while the color resists are manufactured in the display region 10, manufacture of the color resists in the gate driving wiring region 20 can be completed synchronously. Therefore, the design of manufacturing the color resist structure in the gate driving wiring region 20 provided by this embodiment unlikely causes manufacturing processes of the display panel to be complicated.

The display panel further includes a photoresist layer 108 disposed on the color resist layer 107. The photoresist layer 108 covers the display region 10 and the gate driving wiring region 20 of the display panel. The photoresist layer 108 is configured to provide further protection for metal layers and insulation film layers under the color resist layer 107 to reduce the risk of being etched and damaged.

The display panel further includes a pixel electrode 109 disposed on the photoresist layer 108. The pixel electrode 109 covers the display region 10, and the pixel electrode 109 at least covers a part of the gate driving wiring region 20. The pixel electrode 109 located in the display region 10 is electrically connected to the second metal layers 105 by the photoresist layer 108, the color resist layer 107, and a via hole located on the second insulation layer 106. The pixel electrode 109 is disposed corresponding to the pixel units of the display panel. The pixel electrode 109 receives data signals transmitted from the second metal layers 105 to control display of each pixel unit.

The display panel further includes a liquid crystal layer 111 disposed on the pixel electrode 109, and the liquid crystal layer 111 is disposed corresponding to the display region 10. A sealant 110 is disposed on a film layer of the liquid crystal layer 111 corresponding to the gate driving wiring region 20. Liquid crystals are disposed in the liquid crystal layer 111, and the liquid crystals are configured to adjust display grayscale of the display panel. The sealant 110 is configured to encapsulate lateral sides of the liquid crystal layer 111.

The display panel further includes a common electrode 112 disposed on the liquid crystal layer 111 and the sealant 110. The common electrode 112 covers the display region 10 and the gate driving wiring region 20 of the display panel. The common electrode 112 is electrically connected to the common wiring region 30. The common electrode 112 is configured to provide a common voltage to drive the liquid crystals in the liquid crystal layer 111 to deflect.

The display panel further includes an upper substrate 113 located on the common electrode 112. The upper substrate 113 covers the display region 10 and the gate driving wiring region 20 of the display panel.

Figure 4:
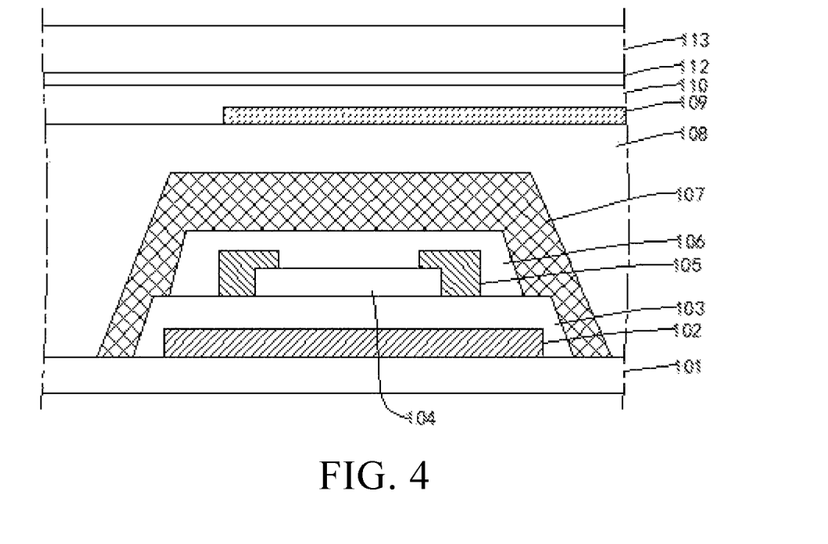
FIG. 4 is a schematic diagram of a second partially sectional structure of the gate driving wiring region of the display panel illustrated in FIG. 1.

In one embodiment, please refer to FIG. 4. FIG. 4 is a schematic diagram of a second partially sectional structure of the gate driving wiring region of the display panel illustrated in FIG. 1. Wherein, the sectional structure of the display region corresponding to FIG. 4 is same as the sectional structure of the display region illustrated in FIG. 3.

The sectional structure of the gate driving wiring region 20 illustrated in FIG. 4 is similar to the sectional structure of the gate driving wiring region 20 illustrated in FIG. 2, their difference is as follows:

the first insulation layer 103 covers all exposed surfaces of the first metal layer 102 along arrangement positions of the first metal layer 102; the second insulation layer 106 covers all exposed surfaces of the second metal layers 105 along arrangement positions of the second metal layers 105; and the color resist layer 107 forms an enveloping cover on all exposed surfaces of the first insulation layer 103 and the second insulation layer 106, so that complete protection on the first insulation layer 103 and the second insulation layer 106 is formed, and damage to the first insulation layer 103 and the second insulation layer 106 caused by processes such as etching of the display panel is prevented.

In the embodiment, by disposing the color resists in the gate driving wiring region 20, film layers near the second metal layers 105 are protected, and fabrication processes such as etching of the display panel generating effect of etching and damage on the insulation layer covering the second metal layers 105 and the insulation layer between the first metal layer 102 and the second metal layers 105 is prevented. Therefore, exposure of the second metal layers 105 and short-circuit between the first metal layer 102 and the second metal layers 105 are prevented, which is conducive to improving fabrication processes of the display panel. Furthermore, the color resists covering the second metal 105 are same as the color resists of the display region 10, and they can be manufactured in one same fabrication process. Therefore, adding color resist structures in the gate driving wiring region 20 does not cause production processes of the display panel to be complicated.

Figure 5:
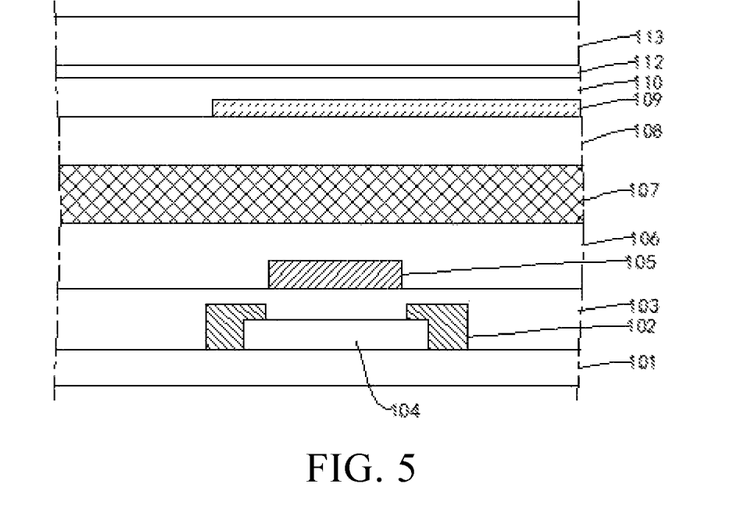
FIG. 5 is a schematic diagram of a third partially sectional structure of the gate driving wiring region of the display panel illustrated in FIG. 1.
Figure 6:
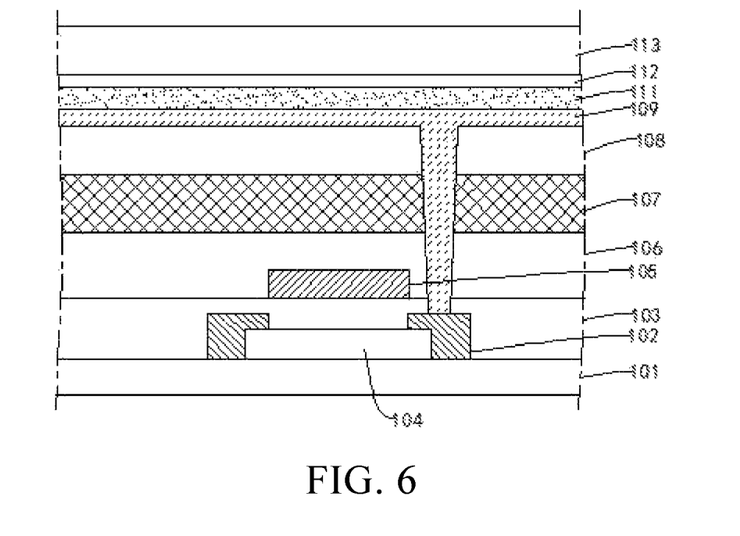
FIG. 6 is a schematic diagram of a second partially sectional structure of the display region of the display panel illustrated in FIG. 1.

In one embodiment, please refer to FIG. 5 and FIG. 6. FIG. 5 is a schematic diagram of a third partially sectional structure of the gate driving wiring region of the display panel illustrated in FIG. 1. FIG. 6 is a schematic diagram of a second partially sectional structure of the display region of the display panel illustrated in FIG. 1. Wherein, the structure of the display panel of the gate driving wiring region illustrated in FIG. 5 is same or similar to the structure of the display panel of the gate driving wiring region illustrated in FIG. 2, and the structure of the display panel of the display region illustrated in FIG. 6 is same or similar to the structure of the display panel of the display region illustrated in FIG. 3. The structures of the display panel illustrated in FIG. 5 and FIG. 6 are described as follows. Wherein, for areas not described in detail, please refer to the description of the aforesaid embodiments.

The display panel includes a base substrate 101 covering the display region 10 and the gate driving wiring region 20. First metal layers 102 and a semiconductor layer 104 are disposed on the base substrate 101. The first metal layers 102 and the semiconductor layer 104 cover the display region 10 and the gate driving wiring region 20 of the display panel. A semiconductor material is disposed in the semiconductor layer 104. The semiconductor material is configured to form an active layer of a thin film transistor. Metal wirings are disposed on the first metal layers 102. The metal wiring includes source electrodes and drain electrodes configured to compose the thin film transistor.

The display panel includes a first insulation layer 103 covering the first metal layers 102 and the semiconductor layer 104. The first insulation layer 103 covers the display region 10 and the gate driving wiring region 20 of the display panel. The first insulation layer 103 includes an inorganic insulation material. The first insulation layer 103 can be a gate insulation layer.

The display panel further includes a second metal layer 105 disposed on the first insulation layer 103. The second metal layer 105 covers the display region 10 and the gate driving wiring region 20 of the display panel. Metal wirings are disposed on the second metal layer 105. The metal wiring includes a gate electrode configured to compose the thin film transistor.

The display panel further includes a second insulation layer 106 covering the second metal layer 105. The second insulation layer 106 covers the display region 10 and the gate driving wiring region 20 of the display panel.

The display panel further includes a color resist layer 107 located on the second insulation layer 106. The color resist layer 107 covers the display region 10 and the gate driving wiring region 20 of the display panel. The color resist layer 107 includes a plurality of color resists.

In the gate driving wiring region 20, the color resists in the color resist layer 107 at least covers a region where the second metal layer 105 is located. Because the second metal layer 105 is located on an upper layer of the first metal layers 102 and the first insulation layer 103, the color resists covering the second metal layer 105 also naturally cover the first metal layers 102 and the first insulation layer 103. Furthermore, because the color resist layer 107 is located on an upper layer of the second insulation layer 106, it inevitably covers the second insulation layer 106. Therefore, in this embodiment, the color resist layer 107 can be used to realize protection for insulation film layers near the second metal layers 105.

Furthermore, color resists located in the gate driving wiring region 20 can be at least one of blue color resists, green color resists, or red color resists, and the blue color resists are preferred. When the color resists of the gate driving wiring region 20 are configured as the blue color resists, using the color resists to protect film layers near the second metal layers 105 is realized, while low light transmissive or non-light transmissive effect of the display panel in the gate driving wiring region 20 is achieved by using a characteristic of light of the blue color resists being relatively dark at the same time, which improves display quality of the display panel.

In this embodiment, by disposing the color resists covering the second metal layer 105 in the gate driving wiring region 20, protection for film layers near the second metal layer 105 is enhanced, the second metal layer 105 being exposed and short-circuit between the first metal layers 102 and the second metal layer 105 due to fabrication processes such as etching of the display panel generating effect of etching and damage on the insulation layer covering the second metal layer 105 and the insulation layer between the first metal layers 102 and the second metal layer 105 is prevented. Therefore, this embodiment is conducive to improving yield of the fabrication processes of the display panel.

In the display region 10, the color resist layer includes a plurality of color resist blocks arranged in an array manner. Each of the color resist blocks is disposed corresponding to one pixel unit of the display panel. The color resists located in the display region 10 include red color resists, green color resists, and blue color resists. The red color resists, the green color resists, and the blue color resists are arranged alternately. The red color resists correspond to red pixel units of the display panel. The green color resists correspond to green pixel units of the display panel. The blue color resists correspond to blue pixel units of the display panel. The color resists located in the display region 10 are configured to filter light emitted from the display panel, thereby realizing color display.

Furthermore, materials and manufacturing processes of the color resists located in the display region 10 and the color resists located in the gate driving wiring region 20 are maintained consistent. Therefore, while the color resists are manufactured in the display region 10, manufacture of the color resists in the gate driving wiring region 20 can be completed synchronously. Therefore, the design of manufacturing the color resist structure in the gate driving wiring region 20 provided by this embodiment unlikely causes manufacturing processes of the display panel to be complicated.

The display panel further includes a photoresist layer 108 disposed on the color resist layer 107. The photoresist layer 108 covers the display region 10 and the gate driving wiring region 20 of the display panel.

The display panel further includes a pixel electrode 109 disposed on the photoresist layer 108. The pixel electrode 109 covers the display region 10, and the pixel electrode 109 at least covers a part of the gate driving wiring region 20. The pixel electrode 109 located in the display region 10 is electrically connected to the first metal layers 102 through the photoresist layer 108, the color resist layer 107, and via holes on the second insulation layer 106 and the first insulation layer 103. The pixel electrode 109 is disposed corresponding to the pixel units of the display panel. The pixel electrode 109 receives data signals transmitted from the first metal layers 102 to control display of each pixel unit.

The display panel further includes a liquid crystal layer 111 disposed on the pixel electrode 109, and the liquid crystal layer 111 is disposed corresponding to the display region 10. A sealant 110 is disposed on a film layer of the liquid crystal layer 111 corresponding to the gate driving wiring region 20. Liquid crystals are disposed in the liquid crystal layer 111, and the liquid crystals are configured to adjust display grayscale of the display panel. The sealant 110 is configured to encapsulate lateral sides of the liquid crystal layer 111.

The display panel further includes a common electrode 112 disposed on the liquid crystal layer 111 and the sealant 110. The common electrode 112 covers the display region 10 and the gate driving wiring region 20 of the display panel. The common electrode 112 is electrically connected to the common wiring region 30. The common electrode 112 is configured to provide a common voltage to drive the liquid crystals in the liquid crystal layer 111 to deflect.

The display panel further includes an upper substrate 113 located on the common electrode 112. The upper substrate 113 covers the display region 10 and the gate driving wiring region 20 of the display panel.

Optionally, please refer to FIG. 5. The first insulation layer 103 can further cover all exposed surfaces of the first metal layers 102 along arrangement positions of the first metal layers 102. The second insulation layer 106 can further cover all exposed surfaces of the second metal layer 105 along an arrangement position of the second metal layer 105. The color resist layer 107 forms an enveloping cover on all exposed surfaces of the first insulation layer 103 and the second insulation layer 106, so that complete protection on the first insulation layer 103 and the second insulation layer 106 is formed.

In summary, in the display panel provided by the embodiments of the present application, by disposing the color resists in the gate driving wiring region, protection for film layers near the second metal layer is enhanced, and fabrication processes such as etching of the display panel generating effect of etching and damage on the insulation layer covering the second metal layer and the insulation layer between the first metal layer and the second metal layer is prevented. Therefore, exposure of the second metal layer and short-circuit between the first metal layer and the second metal layer are prevented, which is conducive to improving fabrication processes of the display panel. Furthermore, the color resists covering the second metal are same as the color resists of the display region, and they can be manufactured in one same fabrication process. Therefore, adding color resist structures in the gate driving wiring region does not cause production processes of the display panel to be complicated.

One embodiment of the present application further provides a display device. The display device includes the display panel provided by the embodiments of the present application. The display device can be a device having display functions, such as a display, a mobile phone, a tablet PC, a laptop, a global positioning system, and a television, etc.

It should be noted that although the present application has disclosed the specific embodiments as above, the above-mentioned embodiments are not to limit to the present application. A person skilled in the art can make any change and modification; therefore, the scope of protection of the present application is subject to the scope defined by the claims.

What is claimed is:

1. A display panel, comprising
a display region and a gate driving wiring region disposed on at least one side of the display region;
wherein the display panel further comprises a color resist layer disposed corresponding to the display region and the gate driving wiring region;
the color resist layer comprises color resists; and
the gate driving wiring region comprises a first metal layer, a first insulation layer covering the first metal layer, second metal layers disposed on the first insulation layer, and a second insulation layer covering the second metal layers, the first insulation layer covers all exposed surfaces of the first metal layer along an arrangement position of the first metal layer, the second insulation layer covers all exposed surfaces of the second metal layers along arrangement positions of the second metal layers, and the color resist layer located in the gate driving wiring region encloses all exposed surfaces of the first insulation layer and the second insulation layer.

2. The display panel as claimed in claim 1, wherein
the gate driving wiring region comprises a photoresist layer; and
the photoresist layer covers a portion of the color resists located in the gate driving wiring region.

3. The display panel as claimed in claim 2, wherein
the photoresist layer is disposed in the display region, and the photoresist layer further covers a portion of the color resists located in the display region.

4. The display panel as claimed in claim 2, wherein
the display panel further comprises pixel electrodes, and at least part of the pixel electrodes are located in the gate driving wiring region.

5. The display panel as claimed in claim 4, wherein
part of the pixel electrodes located in the gate driving wiring region are disposed on the photoresist layer.

6. The display panel as claimed in claim 1, wherein
a semiconductor layer is further disposed between the first metal layer and the second insulation layer, and the second metal layers are disposed on the semiconductor layer.

7. The display panel as claimed in claim 1, wherein
the first metal layer is disposed corresponding to the display region and the gate driving wiring region; and
the second metal layers are disposed corresponding to the display region and the gate driving wiring region.

8. The display panel as claimed in claim 1, wherein
part of the color resists located in the gate driving wiring region comprise blue color resists.

9. The display panel as claimed in claim 1, wherein
the display panel further comprises a common wiring region disposed on a side of the gate driving wiring region away from the display region, and common wirings are disposed in the common wiring region.

10. The display panel as claimed in claim 1, wherein
the first metal layer is provided in the display region and the gate driving wiring region of the display panel.

11. The display panel as claimed in claim 1, wherein
the second metal layers cover the display region and the gate driving wiring region of the display panel.

12. The display panel as claimed in claim 1, wherein
the first metal layer comprises gate electrodes configured to compose thin film transistors.

13. The display panel as claimed in claim 12, wherein
the second metal layers comprise source electrodes and drain electrodes configured to compose the thin film transistors.

14. The display panel as claimed in claim 13, wherein
pixel electrodes disposed corresponding to the display region are electrically connected to the second metal layers.

15. The display panel as claimed in claim 1, wherein
the first metal layer comprises source electrodes and drain electrodes configured to compose thin film transistors.

16. The display panel as claimed in claim 15, wherein
the second metal layers comprise gate electrodes configured to compose the thin film transistors.

17. The display panel as claimed in claim 16, wherein
pixel electrodes disposed corresponding to the display region are electrically connected to the first metal layer.

18. A display device, comprising
a display panel, wherein the display panel comprises a display region and a gate driving wiring region disposed on at least one side of the display region;
the display panel further comprises a color resist layer disposed corresponding to the display region and the gate driving wiring region;
the color resist layer comprises color resists; and
the gate driving wiring region comprises a first metal layer, a first insulation layer covering the first metal layer, second metal layers disposed on the first insulation layer, and a second insulation layer covering the second metal layers, the first insulation layer covers all exposed surfaces of the first metal layer along an arrangement position of the first metal layer, the second insulation layer covers all exposed surfaces of the second metal layers along arrangement positions of the second metal layers, and the color resist layer located in the gate driving wiring region encloses all exposed surfaces of the first insulation layer and the second insulation layer.

* * * * *